No. 825,900. PATENTED JULY 17, 1906.
F. GAYER.
SECTIONAL GEAR WHEEL.
APPLICATION FILED MAR. 15, 1904. RENEWED JAN. 5, 1906.

UNITED STATES PATENT OFFICE.

FRANCOIS GAYER, OF PARIS, FRANCE.

SECTIONAL GEAR-WHEEL.

No. 825,900.          Specification of Letters Patent.          Patented July 17, 1906.

Application filed March 15, 1904. Renewed January 5, 1906. Serial No. 294,751.

*To all whom it may concern:*

Be it known that I, FRANCOIS GAYER, a citizen of the Republic of France, residing at Paris, France, have invented certain new and useful Improvements in Sectional Gear-Wheels, of which the following is a full, clear, and exact specification.

The present invention relates to a gear-wheel made of two parts which are bolted together in the well-known manner and which are provided with a steel tire or wrought-iron tire firmly secured to the rim and into which the teeth are cut. The body of a wheel in this way constructed can be used forever when from time to time the toothed crown or tire is replaced by a new one. The wheels, moreover, will stand much more wear and tear in view of the fact that wrought-iron, and especially steel, is more resistant than cast-iron.

Figure 1:
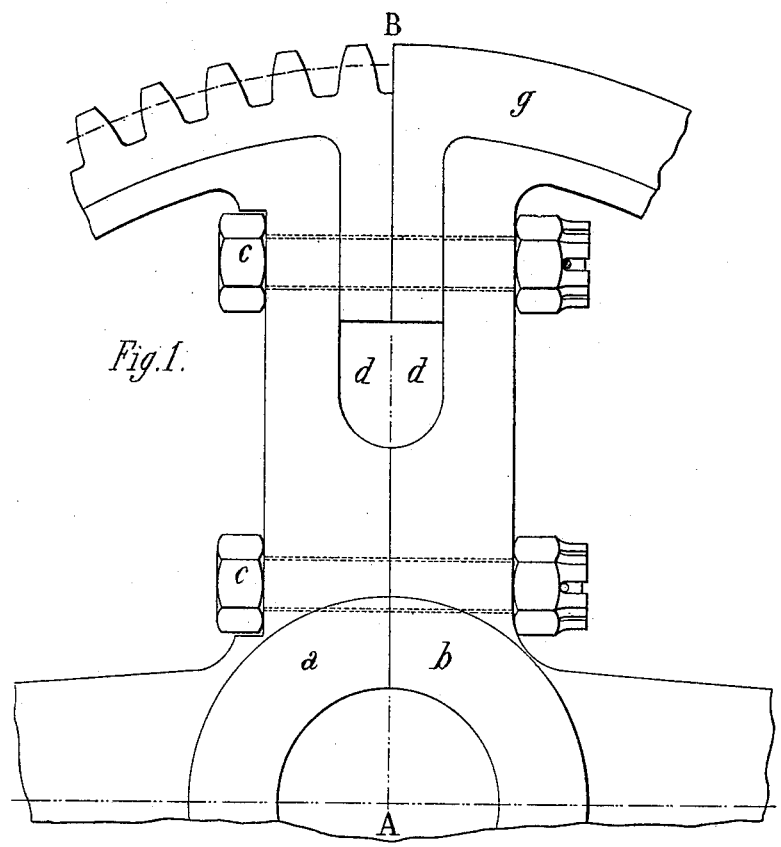
Figure 2:
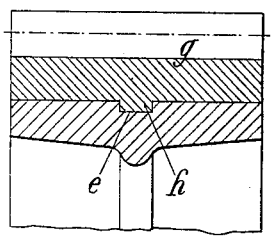
Figure 3:
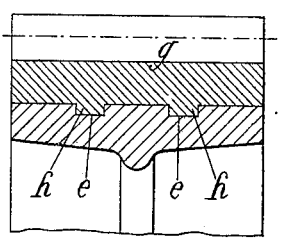
Figure 4:
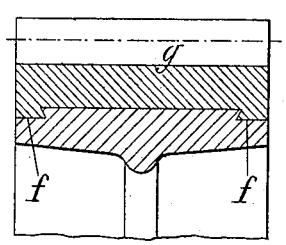

In the accompanying drawings, forming part of this specification, Figure 1 shows part of a gear-wheel in side elevation with the connecting-bolts, showing on one side the teeth cut in and showing on the other side the tire before the cutting. Fig. 2 is a cross-section through the wheel-rim and tire. Figs. 3 and 4 are similar sections of modified forms.

The body of the wheel is composed, as usual with this kind of wheels, of two parts *a b*, held together by bolts *c*, each part having near the line of union A B a notch *d*, into which the bent extremity of a steel or wrought-iron tire *g* engages. Said steel tire is provided on its inner surface with a web or rib *h*, Fig. 2, or with two similar ribs, Fig. 3, which engage into corresponding grooves cut into the outer surface of the wheel-rim. The grooves and ribs can be square, as shown in Figs. 2 and 3, or dovetailed. Instead of having the ribs on the tire and the grooves in the wheel-rim just as well the latter may be provided with projecting ribs, which enter into a groove in the inner surface of the tire, as shown in Fig. 4. Ribs and grooves serve to prevent any lateral displacement of the tires, while the ends bent at right angles and placed into the notches *d* connect the tires to the rim, so as to make any shifting impossible.

Wheels of the described nature are mounted in the following manner: After having bolted the parts *a* and *b* together grooves are cut into the wheel-rim on the lathe corresponding to the rib or ribs of the steel rim *g*. Then the parts *a b* are disconnected again, and on each half a steel bar *g* is driven by means of a suitable bending-machine till both ends stand straight over the notch *d*. These ends are then bent inwardly, as shown in Fig. 1, and the two halves are again bolted together. Now the teeth are cut into the tire in the ordinary well-known manner.

Having thus described my invention, what I claim is—

1. A wheel made of two parts, bolted together, each part having a rim and having a tire of wrought material, rim and tire being provided with means to prevent lateral displacement, the ends of said tires being bent approximately to a right angle and being fitted into notches provided in the frame of the wheel for that purpose, substantially as described.

2. A wheel made of two parts, bolted together, each part having a rim with a circular groove in its outer surface and having a tire of wrought metal covering the rim and having a rib which fits into said groove, the ends of said tires being bent approximately to a right angle and being fitted into notches provided in the frame of the wheel for that purpose, substantially as described.

3. A wheel made of two parts bolted together, each part having a rim with a plurality of circular grooves in its outer surface and having a tire of wrought metal covering the rim and having a plurality of ribs fitting into said grooves, the ends of said tires being bent approximately to a right angle and being fitted into notches provided in the frame of the wheel for that purpose, substantially as described.

In witness whereof I have hereunto set my hand in presence of two witnesses.

FRANCOIS GAYER.

Witnesses:
   JEAN BONNICARS,
   HANSON C. COXE.